United States Patent
Lee et al.

(10) Patent No.: US 9,191,964 B2
(45) Date of Patent: Nov. 17, 2015

(54) METHOD AND APPARATUS FOR ALLOCATING OPERATING CHANNEL PRIORITY BETWEEN FREQUENCY SHARING SYSTEMS

(71) Applicant: Electronics and Telecommunications Research Institute, Daejeon (KR)

(72) Inventors: Dong Hun Lee, Daejeon (KR); Hyun Duk Kang, Gwangju (KR); Byung Jang Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 206 days.

(21) Appl. No.: 13/928,315

(22) Filed: Jun. 26, 2013

(65) Prior Publication Data

US 2014/0016578 A1    Jan. 16, 2014

(30) Foreign Application Priority Data

Jul. 13, 2012   (KR) .................. 10-2012-0076856
Mar. 27, 2013   (KR) .................. 10-2013-0033018

(51) Int. Cl.
| | | |
|---|---|---|
| *H04W 72/00* | (2009.01) | |
| *H04W 72/10* | (2009.01) | |
| *H04W 72/12* | (2009.01) | |
| *H04L 27/00* | (2006.01) | |
| *H04W 16/14* | (2009.01) | |
| *H04L 5/00* | (2006.01) | |

(52) U.S. Cl.
CPC ............. *H04W 72/10* (2013.01); *H04L 5/0033* (2013.01); *H04L 5/0064* (2013.01); *H04L 5/0066* (2013.01); *H04L 27/0006* (2013.01); *H04W 16/14* (2013.01); *H04W 72/12* (2013.01); *H04L 5/0007* (2013.01); *H04L 5/0044* (2013.01); *H04W 72/00* (2013.01)

(58) Field of Classification Search
None
See application file for complete search history.

(56) References Cited

U.S. PATENT DOCUMENTS

| | | | | |
|---|---|---|---|---|
| 7,860,197 | B2* | 12/2010 | Hur et al. | 375/344 |
| 8,620,219 | B2* | 12/2013 | Hyon et al. | 455/62 |
| 2007/0091720 | A1* | 4/2007 | Woo et al. | 367/39 |
| 2009/0221286 | A1 | 9/2009 | Kim et al. | |
| 2010/0086010 | A1* | 4/2010 | Choi et al. | 375/132 |
| 2010/0173586 | A1* | 7/2010 | McHenry et al. | 455/62 |
| 2012/0115525 | A1 | 5/2012 | Kang et al. | |
| 2012/0172075 | A1 | 7/2012 | Hyon et al. | |
| 2015/0072702 | A1* | 3/2015 | Chun et al. | 455/454 |

FOREIGN PATENT DOCUMENTS

KR   10-2012-0047830 A   5/2012

\* cited by examiner

*Primary Examiner* — Brian Roberts

(57) ABSTRACT

Disclosed is a method for improving the efficiency of sharing a frequency between a plurality of adjacent systems using an idle band. A method for allocating an operating channel priority between frequency sharing systems according to the present invention includes: a coarse channel priority allocating operation of collecting information about a target white space object (WSO) for priority allocation of an operating channel and information about the operating channel, and classifying the operating channel based on a predetermined criterion; and a fine channel priority allocating operation of removing the operating channel by checking an interference level of the classified operating channel.

18 Claims, 5 Drawing Sheets

METHOD AND APPARATUS FOR ALLOCATING OPERATING CHANNEL PRIORITY BETWEEN FREQUENCY SHARING SYSTEMS

CROSS-REFERENCE TO RELATED APPLICATIONS

This application claims priority to and the benefit of Korean Patent Application No. 10-2012-0076856 filed on Jul. 13, 2012 and 10-2013-0033018 filed on Mar. 27, 2013 in the Korean Intellectual Property Office, the entire contents of which are incorporated herein by reference.

TECHNICAL FIELD

The present invention relates to a method of improving the efficiency of sharing a frequency between a plurality of adjacent systems using an idle band.

BACKGROUND ART

A mutual coexistence technology refers to a spectrum management technology that enables wireless devices using different communication protocols to mutually coexist without causing harmful interference in a core frequency (30 MHz to 10 GHz) in which various dynamic spectrum access (DSA) technologies are predicted to appear. A DSA technology, such as underlay, overlay, and the like, is a concept opposite to a current static spectrum management technology, and refers to a wireless access and management technology that maximizes flexibility and efficiency of using a frequency by dynamically managing a spectrum based on a peripheral propagation environment of a wireless device. A technology is developed to induce a mutual coexistence criterion capable of inclusively operating a plurality of sharing technologies in a national aspect of spectrum management in preparation for frequency sharing technologies, variously appearing for each wireless service such as the Institute of Electrical and Electronics Engineers (IEEE) 802, SCC 41, and the like.

In view of a domestic aspect, research on an integrated mutual coexistence condition of various sharing technologies for securing the optimal frequency efficiency in an interfering propagation environment such as a frequency auction system, sharing of a license band and a non-license band, and the like, is not being conducted systematically. The IEEE 802.19, which is an international standardization organization, refers to a wireless coexistence working group (WG) that handles a coexistence issue between 802 standards, and is discussing technical issues on a coexistence scenario between wireless systems that share a frequency in a license band and a non-license band, mutual consistence analysis, a sharing mechanism for the mutual coexistence, and the like.

SUMMARY OF THE INVENTION

The present invention has been made in an effort to provide a method for allocating an operating channel priority for effective mutual coexistence between frequency sharing systems.

An exemplary embodiment of the present invention provides a method for allocating an operating channel priority between frequency sharing systems, the method including: a coarse channel priority allocating operation of collecting information about a target white space object (WSO) for priority allocation of an operating channel and information about the operating channel, and classifying the operating channel based on a predetermined criterion; and a fine channel priority allocating operation of removing the operating channel by checking an interference level of the classified operating channel.

Information about the target WSO includes channel classification information about the target WSO and coexistence set information.

The coexistence set information includes a license type of a coexistence set and network technology information.

Information about the operating channel includes information about a total occupancy rate of the operating channel and the number of elements included in a coexistence set.

The coarse channel priority allocating operation includes: an information collecting operation of collecting information for the priority allocation of the operating channel; an operating channel removing operation of removing an operating channel used by a coexistence set element of a license type among operating channels; and a priority allocating operation of allocating priority of operating channels of a coexistence set element of a non-license type among the operating channels.

The priority allocating operation includes: a first group allocating operation of allocating the operating channel to a first group used by a coexistence set element of the same network technology as the target WSO; and a second group allocating operation of allocating, to a second group, a remaining channel excluding the first group.

The priority is allocated to channels of the first group and the second group in an ascending order of a total occupancy rate.

When the total occupancy rate is identical, the priority is allocated in an ascending order of the number of coexistence set elements using an operating channel of which the occupancy rate is identical.

The fine channel priority allocating operation removes an operating channel of which an interference level exceeds a predetermined threshold by checking in advance an interference level of the operating channel of the first group or the second group.

Another exemplary embodiment of the present invention provides an apparatus for allocating an operating channel priority between frequency sharing systems, the apparatus including: a coarse channel priority allocating unit configured to collect information about a target WSO for priority allocation of an operating channel and information about the operating channel, and to classify the operating channel based on a predetermined criterion; and a fine channel priority allocating unit configured to remove the operating channel by checking an interference level of the classified operating channel.

In an operating channel priority allocating method according to exemplary embodiments of the present invention, only a white space object (WSO) capable of using only an operating channel instead of using an available channel registered to a coexistence manager (CM) entity or a use-limited channel is utilized for effective channel allocation and thus, it is possible to effectively enhance mutual coexistence between frequency sharing systems.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
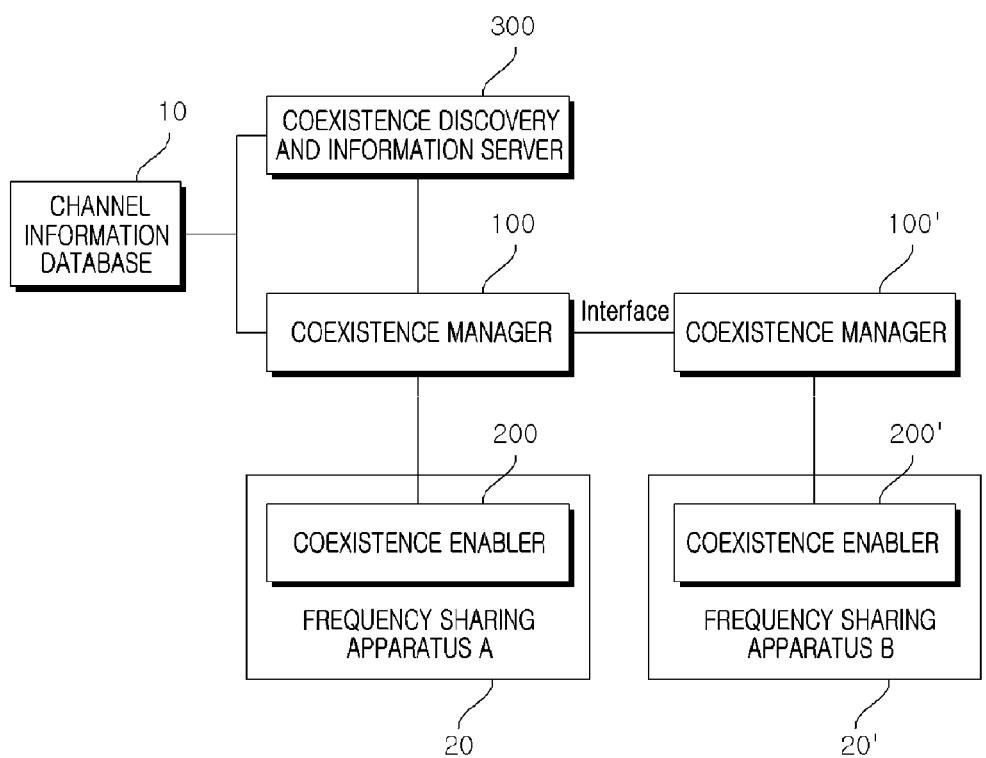
FIG. 1 is a block diagram illustrating a structure of a mutual coexistence management system for managing a frequency sharing apparatus.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The following description simply exemplifies the principle of the invention. Therefore, although not clearly described or illustrated in the present specification, those skilled in the art may configure the principle of the invention and may invent a variety of apparatuses included in the concept and scope of the invention. All of the conditional terminologies and exemplary embodiments enumerated in the present specification should be understood to be clearly intended only for the purpose of making the concept of the invention be understood in principle, and should not be understood to be limited to the particularly enumerated exemplary embodiments and states.

The present invention relates to a mutual coexistence management system for efficiently managing a frequency sharing apparatus by detecting a frequency band, for example, an idle frequency band (hereinafter, referred to as a white space (WS)), which is available in a frequency band already being used, such as a television (TV) band, in a communication system, for example, a cognitive radio ((CR) and hereinafter, referred to as a CR) system, and an Institute of Electrical and Electronics Engineers (IEEE) 802.19 based system. Although a description will be made using the IEEE 802.19 based system as an example, the method proposed in the present invention may also be applied to other communication systems.

An exemplary embodiment of the present invention proposes a method for efficiently managing a frequency sharing apparatus in a TV band by enabling a plurality of different systems to coexist in a communication system. Here, in the exemplary embodiment of the present invention, entities of a resource management system for sharing an available frequency band in a communication system mutually coexist, and a plurality of different systems, particularly, systems using different communication schemes, for example, a wireless access scheme, coexist. Accordingly, the coexisting systems are enabled to share an available frequency band in a frequency band already being used such as a TV band, thereby improving the efficiency of using a frequency resource.

That is, in the exemplary embodiment of the present invention, a resource management system for coexistence and frequency sharing between a plurality of different systems in a communication system may share an available frequency band, thereby improving the efficiency of using a limited frequency resource. Accordingly, a structure of a mutual coexistence management system for managing a frequency sharing apparatus according to an exemplary embodiment of the present invention will be further described in detail with reference to FIG. 1.

FIG. 1 is a block diagram illustrating a structure of a mutual coexistence management system for managing a frequency sharing apparatus for the purpose of improving the efficiency of sharing a frequency between a plurality of frequency sharing apparatuses. A channel information database 10 is a database to provide channel information that may be used by frequency sharing apparatuses 20 and 20'. A frequency sharing apparatus controlling system includes the following three entities.

A coexistence enabler ((CE) and hereinafter, referred to as a CE) 200 is an entity that is present within the frequency sharing apparatus 20 and serves as a path between a coexistence manager ((CM) and hereinafter, referred to as a CM) 100 and the frequency sharing apparatus 20. The CE 200 serves to extract, from the frequency sharing apparatus 20, context information (wireless access scheme, transmission power, a spectrum sensing threshold value, a position, etc.) associated with a corresponding frequency sharing apparatus requested by the CM 100, to transmit the extracted context information to the CM 100, to transmit event information (change in context information of the frequency sharing apparatus 20) requested by the CM 100, and to reflect, in the frequency sharing apparatus 20, resetting of a configuration (element constituting an apparatus) of the frequency sharing apparatus 20 instructed by the CM 100.

The CM 100 is an entity that makes an important decision associated with frequency sharing, such as operational frequency allocation, transmission power allocation, transmission time allocation, and the like, in order to improve the efficiency sharing a frequency between the plurality of frequency sharing apparatuses 20 and 20'. The CM 100 may collect channel measurement information and the like through the frequency sharing apparatus 20. In a case in which cooperation with another CM 100' controlling another frequency sharing apparatus 20' is required, the CM 100 may directly exchange information, or may exchange information through a coexistence discovery and information server ((CDIS) and hereinafter, referred to as a CDIS) 300. Channel information that may be used by the frequency sharing apparatuses 20 and 20' may be fetched from the channel information database 10.

The CDIS 300 is an entity that helps the CM 100 makes a decision associated with controlling of the frequency sharing apparatus 20. The CDIS 300 receives and stores required information from a plurality of CMs, and transmits information required by a CM connected to the CDIS 300. The CDIS 300 may fetch, from the channel information database 10, channel information that may be used by the frequency sharing apparatuses 20 and 20'.

Hereinafter, a method for allocating an operating channel priority between frequency sharing systems performed by the aforementioned CM 100 will be described with reference to FIG. 2.

Figure 2:
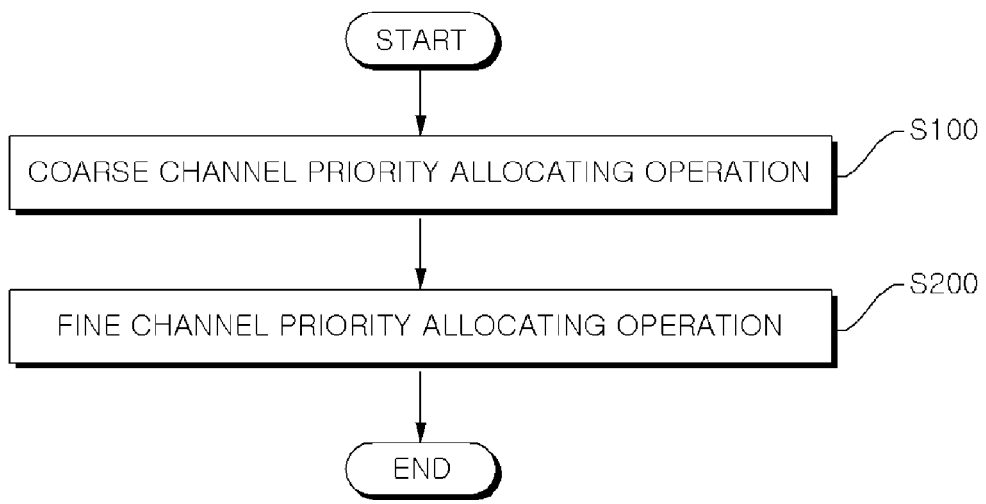
FIG. 2 is a flowchart illustrating a method for allocating an operating channel priority between frequency sharing systems.

FIG. 2 is a flowchart illustrating a method for allocating an operating channel priority between frequency sharing systems. Referring to FIG. 2, the method for allocating the operating channel priority between the frequency sharing systems includes a coarse channel priority allocating operation S100 and a fine channel priority allocating operation S200.

The coarse channel priority allocating operation S100 collects information about a target white space object (WSO) for priority allocation of an operating channel and information about the operating channel, and classifies the operating channel based on a predetermined criterion. Here, the operating channel indicates a channel occupied by coexistence set elements of the target WSO.

The fine channel priority allocating operation S200 removes the operating channel by checking an interference level of the classified operating channel.

Figure 3:
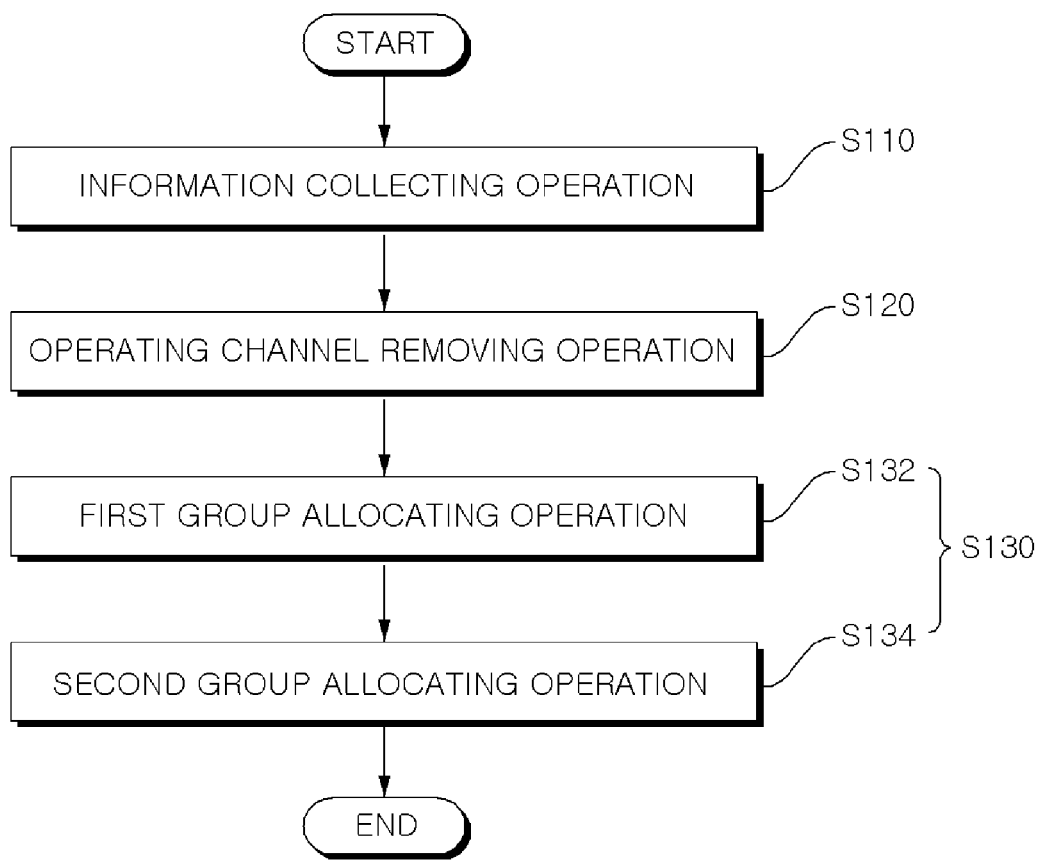
FIG. 3 is a flowchart further illustrating in detail a method for allocating an operating channel priority between frequency sharing systems.

Hereinafter, a further detailed description will be made with reference to FIG. 3. FIG. 3 is a flowchart further illustrating in detail a method for allocating an operating channel priority between frequency sharing systems. The coarse channel priority allocating operation S100 according to the present exemplary embodiment includes an information collecting operation S110, an operating channel removing operation S120, and a priority allocating operation S130.

The information collecting operation S110 collects information for the priority allocation of the operating channel. In the present exemplary embodiment, the collected information about the target WSO includes channel classification information about the target WSO and coexistence set information. The coexistence set information may include a license type of a coexistence set and network technology information, and information about the operating channel may include information about a total occupancy rate of the operating channel and the number of elements included in a coexistence set.

That is, the coarse channel priority allocating operation S100 uses channel classification information of the target WSO, coexistence set information, a license type of coexistence set elements using an operating channel, network technology information, the total occupancy rate of the operating channel, and the number of coexistence set elements.

The operating channel removing operation S120 removes an operating channel used by a coexistence set element of a license type among operating channels.

The priority allocating operation S130 allocates priority of operating channels of a coexistence set element of a non-license type among the operating channels. In the present exemplary embodiment, the priority allocating operation S130 includes a first group allocating operation S132 and a second group allocating operation S134.

The first group allocating operation S132 allocates the operating channel to a first group used by a coexistence set element of the same network technology as the target WSO.

The second group allocating operation S134 allocates, to a second group, a remaining channel excluding the first group.

The priority is allocated to channels of the first group and the second group in an ascending order of the total occupancy rate.

Here, when the total occupancy rate is identical or is similar within a predetermined error range, the priority is allocated in an ascending order of the number of coexistence set elements using an operating channel of which the occupancy rate is identical or similar.

Next, the fine channel priority allocating operation S200 removes an operating channel of which an interference level exceeds a predetermined threshold by checking in advance an interference level of the operating channel of the first group or the second group.

Hereinafter, a primitive and a message of a mutual coexistence system for embodying a priority allocation method according to an exemplary embodiment of the present invention will be described with reference to FIGS. 4 and 5.

Figure 4:
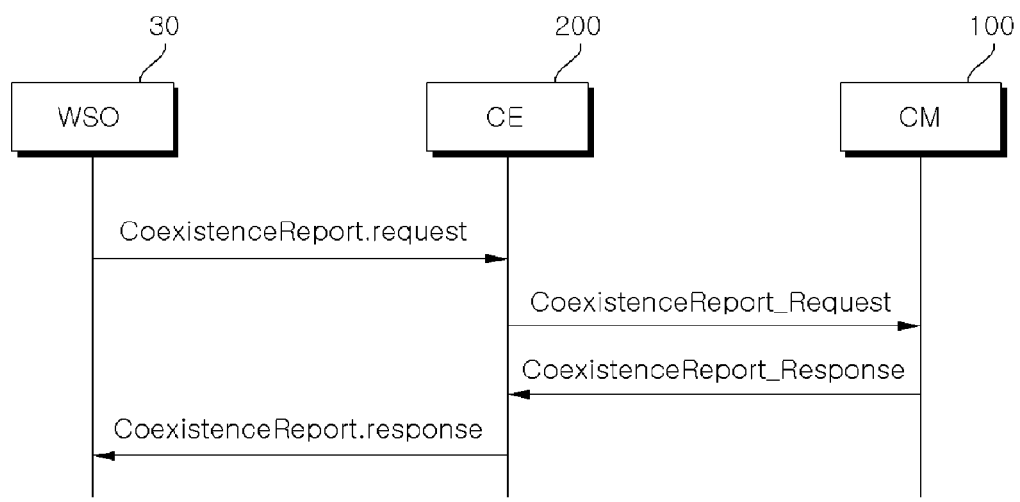
FIG. 4 is a diagram illustrating a process of transmitting and receiving a message based on request/response.

FIG. 4 is a diagram illustrating a process of transmitting and receiving a primitive and a message based on request/response. As illustrated in FIG. 4, the primitive and the message based on request/response of a mutual coexistence management system for embodying an operating channel priority allocation technology proposed herein are shown in Table 1.

TABLE 1

| Primitive based on request/response | CoexistenceReport.request( ) CoexistenceReport.response( channelPriority ) ChannelPriority :: = SEQUENCE OF ChannelPriorityElement OPTIONAL ChannelPriorityElement :: = SEQUENCE { channelNumber INTEGER, priority INTEGER } |
|---|---|
| Message based on request/response | CoexistenceReport_Request ::= SEQUENCE { } CoexistenceReport_Response ::=SEQUENCE{ channelPriority SEQUENCE OF ChannelPriorityElement OPTIONAL } ChannelPriorityElement ::= SEQUENCE { channelNumber INTEGER, priority INTEGER } |

A WSO 30 capable of using only an operating channel transmits CoexistenceReport.request to the CE 200, and the CE 200 transfers CoexistenceReport_Request to the CM 100. The CM 100 transmits CoexistenceReport_Response to the CE 200, and the CE 200 transfers CoexistenceReport.response to the WSO 30.

Figure 5:
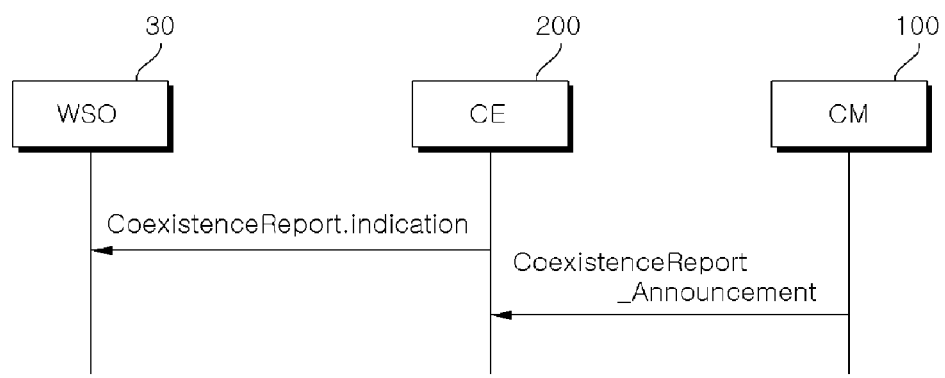
FIG. 5 is a diagram illustrating a process of transmitting and receiving a message based on indication.

FIG. 5 is a diagram illustrating a process of transmitting and receiving a primitive and a message based on indication. As illustrated in FIG. 5, the primitive and the message based on indication of a mutual coexistence management system for embodying an operating channel priority allocation method proposed herein are shown in Table 2.

TABLE 2

| Primitive based on indication | CoexistenceReport.indication( channelPriority ) |
|---|---|
| Message based on indication | CoexistenceReportAnnouncement ::= SEQUENCE{ channelPriority SEQUENCE OF ChannelPriorityElement OPTIONAL } |

The CM (100) transmits CoexistenceReport_Announcement to the CE 200, and the CE 200 transmits CoexistenceReport.indication to the WSO 30.

In the aforementioned operating channel priority allocating method according to the present invention, a WSO capable of using only an operating channel instead of using an available channel registered to a coexistence manager (CM) entity or a use-limited channel is utilized for effective channel allocation and thus, it is possible to effectively enhance mutual coexistence between frequency sharing systems.

Meanwhile, the operating channel priority allocating method between frequency sharing systems of the present invention may be configured as a computer-readable code in recording media. Computer-readable recording media include every type of recording apparatuses that store data readable by a computer system.

An example of computer-readable media includes ROM, RAM, CD-ROM, a magnetic tape, floppy disk, an optical data storage apparatus, and the like. The computer-readable media may be distributed over a computer system connected over a network and thus, a computer-readable code using a distribution scheme may be stored therein and thereby be executed.

Functional programs, codes, and code segments for embodying the present invention may be easily inferred by programmers in the art.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for allocating an operating channel priority between frequency sharing systems, the method comprising:
   a coarse channel priority allocating operation of collecting information about a target white space object (WSO) for priority allocation of an operating channel and information about the operating channel, and classifying the operating channel based on a predetermined criterion; and
   a fine channel priority allocating operation of removing the operating channel by checking an interference level of the classified operating channel.

2. The method of claim 1, wherein information about the target WSO includes channel classification information about the target WSO and coexistence set information.

3. The method of claim 2, wherein the coexistence set information includes a license type of a coexistence set and network technology information.

4. The method of claim 1, wherein information about the operating channel includes information about a total occupancy rate of the operating channel and the number of elements included in a coexistence set.

5. The method of claim 1, wherein the coarse channel priority allocating operation comprises:
   an information collecting operation of collecting information for the priority allocation of the operating channel;
   an operating channel removing operation of removing an operating channel used by a coexistence set element of a license type among operating channels; and
   a priority allocating operation of allocating priority of operating channels of a coexistence set element of a non-license type among the operating channels.

6. The method of claim 5, wherein the priority allocating operation comprises:
   a first group allocating operation of allocating the operating channel to a first group used by a coexistence set element of the same network technology as the target WSO; and
   a second group allocating operation of allocating, to a second group, a remaining channel excluding the first group.

7. The method of claim 6, wherein the priority is allocated to channels of the first group and the second group in an ascending order of a total occupancy rate.

8. The method of claim 7, wherein when the total occupancy rate is identical, the priority is allocated in an ascending order of the number of coexistence set elements using an operating channel of which the occupancy rate is identical.

9. The method of claim 6, wherein the fine channel priority allocating operation removes an operating channel of which an interference level exceeds a predetermined threshold by checking in advance an interference level of the operating channel of the first group or the second group.

10. A non-transitory computer readable medium having stored thereon a computer program, which, when executed by a processor, performs a method, the method comprising:
    collecting information about a target WSO for priority allocation of an operating channel and information about the operating channel, and classifying the operating channel based on a predetermined criterion; and
    removing the operating channel by checking an interference level of the classified operating channel.

11. The non-transitory computer readable medium of claim 10, wherein information about the target WSO includes channel classification information about the target WSO and coexistence set information.

12. The non-transitory computer readable medium of claim 11, wherein the coexistence set information includes a license type of a coexistence set and network technology information.

13. The non-transitory computer readable medium of claim 10, wherein information about the operating channel includes information about a total occupancy rate of the operating channel and the number of elements included in a coexistence set.

14. The non-transitory computer readable medium of claim 10, wherein the method further comprises:
    collecting information for the priority allocation of the operating channel;
    removing an operating channel used by a coexistence set element of a license type among operating channels; and
    allocating priority of operating channels of a coexistence set element of a non-license type among the operating channels.

15. The non-transitory computer readable medium of claim 14, wherein the allocating comprises:
    allocating the operating channel to a first group used by a coexistence set element of the same network technology as the target WSO; and
    allocating, to a second group, a channel excluding the operating channel allocated to the first group.

16. The non-transitory computer readable medium of claim 15, wherein the priority is allocated to channels of the first group and the second group in an ascending order of a total occupancy rate.

17. The non-transitory computer readable medium of claim 16, wherein when the total occupancy rate is identical, the priority is allocated in an ascending order of the number of coexistence set elements using an operating channel of which the occupancy rate is identical.

18. The non-transitory computer readable medium of claim 15, wherein removing the operating channel by checking the interference level comprises removing an operating channel of which an interference level exceeds a predetermined threshold by checking in advance an interference level of the operating channel of the first group or the second group.

* * * * *